(12) United States Patent
Hankins et al.

(10) Patent No.: US 6,970,432 B1
(45) Date of Patent: Nov. 29, 2005

(54) SYSTEM AND METHOD FOR DYNAMICALLY IDENTIFYING INTERNAL HOSTS IN A HETEROGENEOUS COMPUTING ENVIRONMENT WITH MULTIPLE SUBNETWORKS

(75) Inventors: Scott A Hankins, Cupertino, CA (US); Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 878 days.

(21) Appl. No.: 09/884,884

(22) Filed: Jun. 18, 2001

(51) Int. Cl.[7] ............................................. H04L 12/28

(52) U.S. Cl. .................................................... 370/254

(58) Field of Search ................................. 370/389, 392, 370/395.31, 395.3, 229, 230, 231, 235, 252–253, 370/355, 356, 351, 254; 709/201, 203, 238, 709/245, 223–224

(56) References Cited

U.S. PATENT DOCUMENTS 6,262,976 B1 * 7/2001 McNamara ................. 370/254
6,578,077 B1 * 6/2003 Rakoshitz et al. .......... 709/224

* cited by examiner

Primary Examiner—Chi Pham
Assistant Examiner—Viet Le
(74) Attorney, Agent, or Firm—Patrick J. S. Inouye

(57) ABSTRACT

A system and method for dynamically identifying internal hosts in a heterogeneous computing environment with multiple subnetworks is disclosed. A plurality of packets are analyzed. Each such packet includes a source address of an originating host and a destination address of a receiving host. An unknown originating host located at the source address of an outbound packet is classified as an inside host with high confidence. An unknown receiving host located at the destination address of an inbound packet is classified as an inside host. The unknown receiving host is reclassified as an inside host with high confidence upon receiving a further outbound packet having a source address corresponding to the address of the unknown receiving host.

30 Claims, 10 Drawing Sheets

SYSTEM AND METHOD FOR DYNAMICALLY IDENTIFYING INTERNAL HOSTS IN A HETEROGENEOUS COMPUTING ENVIRONMENT WITH MULTIPLE SUBNETWORKS

FIELD OF THE INVENTION

The present invention relates in general to multiple subnet environments and, in particular, to a system and method for dynamically identifying internal hosts in a heterogeneous computing environment with multiple subnetworks.

BACKGROUND OF THE INVENTION

Distributed computing environments, particularly enterprise computing environments, typically comprise an collection of individual subnetworks interconnected both within and externally via hubs, routers, switches and similar devices. These subnetworks generally fall into two categories. Intranetworks, or Local Area Networks (LANs), are computer networks physically defined within a geographically limited area, such as within an office building. Devices operating within an intranetwork share the same subnetwork address space.

Internetworks, or Wide Area Networks (WANs), are computer networks physically defined over a geographically distributed area utilizing private and leased lines obtained through digital communications service providers. The Internet is an example of a widely available public internetwork. Devices operating within an internetwork operate with unique domain address spaces.

Commonly, both intranetworks and internetworks operate in accordance with the Transmission Control Protocol/Internet Protocol (TCP/IP), such as described in W. R. Stevens, "TCP/IP Illustrated, Vol. 1, The Protocols," Chs. 1–3, Addison Wesley (1994), the disclosure of which is incorporated by reference. TCP/IP is a layered networking protocol, comprising a media layer on the physical side, upwards through link, network, transport and application layers. The link and network layers are point-to-point layers and the transport and application layers are end-to-end layers. Packets travel end-to-end and include source and destination addresses to identify their originating and receiving hosts, respectively. Intranetworks are often interconnected to internetworks and gateway routers are used to provide transparent translations of device addresses between subnetwork address spaces and the internetwork domain address spaces.

A traffic manager can be co-located at the network domain boundary with a gateway router to monitor and analyze transient packet traffic for use in traffic analysis and flow control. Traffic managers optimize bandwidth utilization on internetwork connections, as these connections are costly and relatively slow compared to intranetwork connections.

A problem arises in accurately counting and analyzing transient packet traffic in devices that observe traffic flow, either passively or actively, such as traffic manager or network sniffer-type devices. Passive traffic observation is performed by placing the device in a promiscuous mode, wherein all network traffic passes through the device. The term "traffic manager" is used throughout this document, although one skilled in the art would recognize that other related devices within the broader category of traffic flow observation devices may also apply. In a distributed computing environment including multiple subnetworks, packets traveling between separate intranetworks can be double counted: once for the originating host to gateway router hop and twice for the gateway router to receiving host hop. Double counting can hinder efforts at traffic analysis and flow control.

In the prior art, there are two approaches to addressing the double-counting problem. First, the subnetwork addresses can be manually configured into the traffic manager to enable the traffic manager to ignore those packets originating from within an internetwork located within the network domain boundary. Transient packets are identified based on their originating subnetwork, and subnetwork-to-subnetwork traffic is ignored and omitted from counting. However, the manual approach is error prone and imposes an increased administrative burden on network administrators to continually reflect all current subnetwork addresses in the traffic manager.

In a second approach, the traffic manager monitors the routing tables to identify those packets transiting the gateway router from originating hosts operating within an internetwork located within the network domain boundary. This approach also imposes an increased administrative burden and requires up-to-date routing tables.

Therefore, there is a need for an approach to dynamically determining host locations by distinguishing traffic types in heterogeneous distributed computing environments that include multiple subnetworks. Preferably, such an approach would be provide a semi-transparent pass-through for categorizing packet traffic.

There is a further need for an approach to implementing a finite state machine to observe transient packet traffic and determine a state classification based on the source and destination addresses and direction of travel of the packets.

SUMMARY OF THE INVENTION

The present invention provides a system and method for classifying unknown hosts in a distributed computing environment that includes a plurality of intranetworks. A traffic manager analyzes and classifies transient packet traffic based on direction of flow and source and destination address. The hosts are classified into one of four states: Unknown, Outside, Inside and Inside with High Confidence, the last state being a definitive determination that the host is within an subnetwork. The traffic manager maintains a state table in which the current state of each observed host is stored and the classifications are revised as further packets are received until a definitive determination of host location is reached.

An embodiment of the present invention is a system and method for dynamically identifying internal hosts in a heterogeneous computing environment with multiple subnetworks. A plurality of packets are analyzed. Each such packet includes a source address of an originating host and a destination address of a receiving host. An unknown originating host located at the source address of an outbound packet is classified as an inside host with high confidence. An unknown receiving host located at the destination address of an inbound packet is classified as an inside host. The unknown receiving host is reclassified as an inside host with high confidence upon receiving a further outbound packet having a source address corresponding to the address of the unknown receiving host.

A further embodiment is a system and method for classifying hosts in a heterogeneous computing environment. A plurality of states are defined. Each state specifies a location of a host relative to a network domain boundary. The states include an Unknown state describing an undefined host, an Outside state describing a host located outside the network domain boundary, an Inside state describing a host provisionally located inside the network domain boundary and an Inside with High Confidence state describing a host located inside the network domain boundary. Hosts are classified based on source address with each outbound packet originating from an Unknown state, Outside state or Inside state into an Inside with High Confidence state. Hosts are also classified based on destination address with each inbound packet originating from an Unknown state or Outside state into an Inside with High Confidence state.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
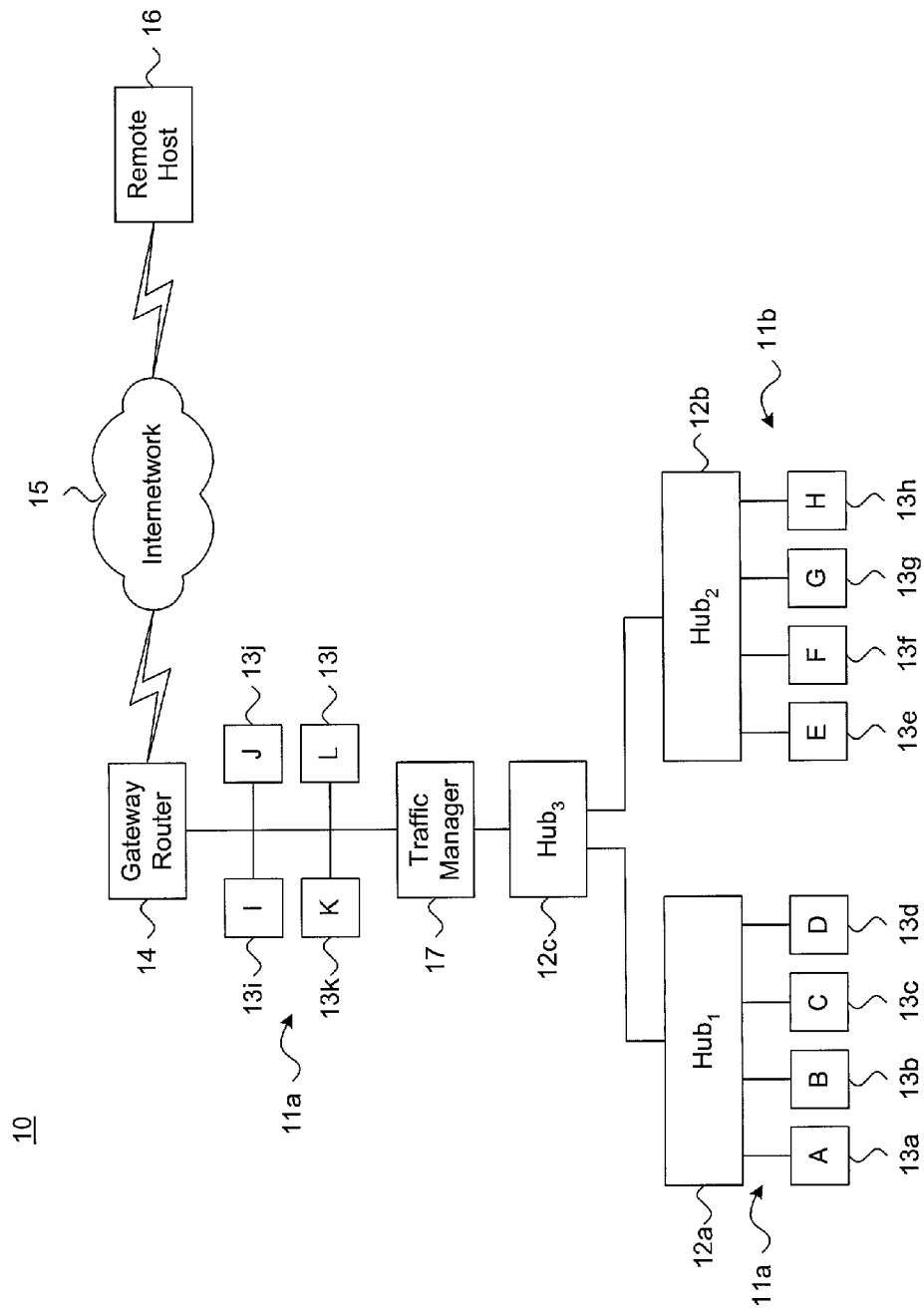
FIG. 1 is a block diagram showing a system for dynamically identifying internal hosts in a heterogeneous computing environment with multiple subnetworks, in accordance with the present invention.

FIG. 1 is a block diagram showing a system for dynamically identifying internal hosts 13*a-d*, 13*e-h*, and 13*i-l* in a heterogeneous computing environment 10 with multiple subnetworks, in accordance with the present invention. By way of example, a pair of intranetworks 11*a*, 11*b* each define separate subnetworks. The individual systems 13*a-d* and 13*i-l* are part of the same logical subnetwork, although the physical addresses of the system are on separate segments. The individual systems 13*e-h* are part of a separate logical subnetwork. The individual systems 13*a-d* and 13*e-h* each are internally interconnected by a hub 12*a*, 12*b* or similar device. In turn, each hub 12*a*, 12*b* is interconnected via a boundary hub 12*c* which feeds into a gateway router 14 at the network domain boundary. The gateway router 14 provides connectivity to one or more remote hosts 16 via an internetwork 15. Other network topologies and configurations are feasible, including various combinations of intranetworks and internetworks, as would be recognized by one skilled in the art. In the described embodiment, both the internetwork 15 and individual intranetworks 11*a*, 11*b* are IP compliant.

Packets are exchanged between the individual systems 13*a-d*, 13*e-h*, and 13*i-l* in the intranetworks 11*a*, 11*b* and remote hosts 16 in the internetwork 15. All packet traffic travels between the separate intranetworks 11*a*, 11*b* and to and from the internetwork 15 by way of the gateway router 14. Note the packets sent to and from individual systems 13*a-d* and 13*i-l* within the intranetwork 11*a* do not go through gateway router 14. While in transit, the packet traffic flows through a traffic manager 17 which monitors and analyzes the traffic for traffic management and flow control. Packet traffic is automatically classified for use in controlling bandwidth allocation according to automatically determined application requirements, such as described in commonly-assigned U.S. patent application Ser. No. 09/198,090, filed Nov. 23, 1998, pending, the disclosure of which is incorporated by reference. As further described below, beginning with reference to FIG. 3, the traffic manager 17 maintains a hosts table to accurately count packet traffic without double-counting local traffic transiting between the separate intranetworks 11*a* and 11*b* and without needing reconfiguration of individual subnetwork topologies.

The individual computer systems, including systems 13*a-d*, 13*e-h* and remote hosts 16, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2A:
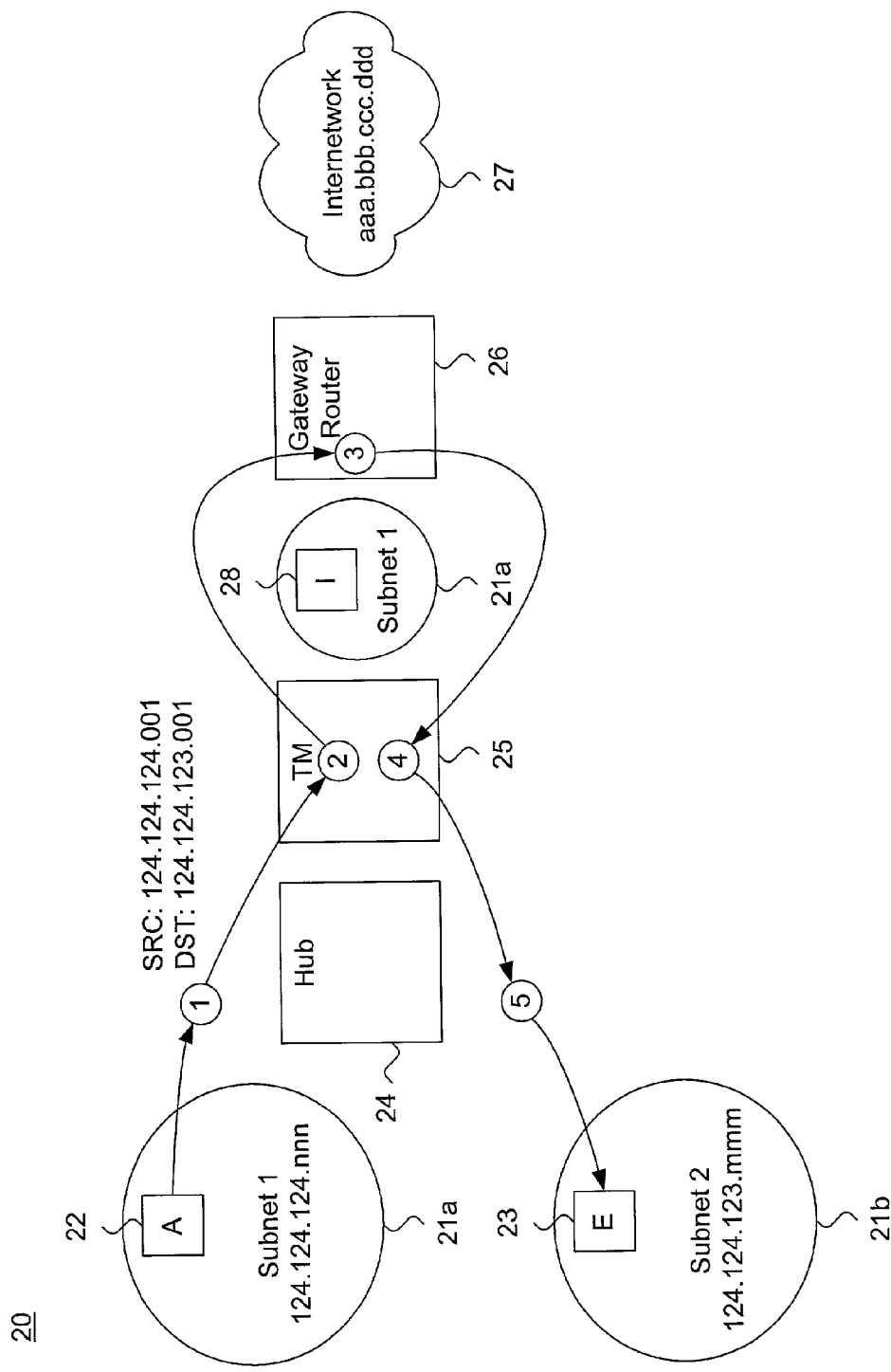
FIG. 2A is a topological network diagram showing a prior art system for managing routed-back packet traffic.

FIG. 2A is a topological network diagram 20 showing a prior art system 20 for managing routed-back packet traffic. A pair of separately defined intranetworks 21*a*, 21*b* are interconnected via a hub 24 and are connected to an internetwork 27 via a gateway router 26. A traffic manager 25 receives transient packets for traffic management and control flow. For simplicity, individual network connections are omitted to emphasize the processing of packet traffic.

By way of example, an originating host 22 operating in the intranetwork 21*a* communicates with a receiving host 23 in a separate intranetwork 21*b*. The intranetwork 21*a* has a subnetwork address space of 124.124.124.nnn where nnn represents an individual node address. Similarly, the intranetwork 21*b* has a separate subnetwork address space of 124.124.123.mmm, where mmm also represents an individual node address. Both of the subnetwork address spaces are distinct from that used in the internetwork 27.

The originating host 22 sends a packet having a source address (SRC) of 124.124.124.001 and a destination address (DST) of 124.124.123.001 (step 1). The packet passes through the traffic manager 25 and is counted for traffic management purposes (step 2). The packet is then received by the gateway router 26 and routed back to the intranetwork 21*b* (step 3). The traffic manager 25 counts the packet again (step 4) and the packet is forwarded on to the receiving host (step 5).

A problem arises when the traffic manager 25 erroneously double-counts the packet (steps 2 and 4). Although the source and destination addresses of the originating and receiving hosts are known, the prior art traffic manager 25 cannot determine, based on the available information, whether the packet has already been counted.

Figure 2B:
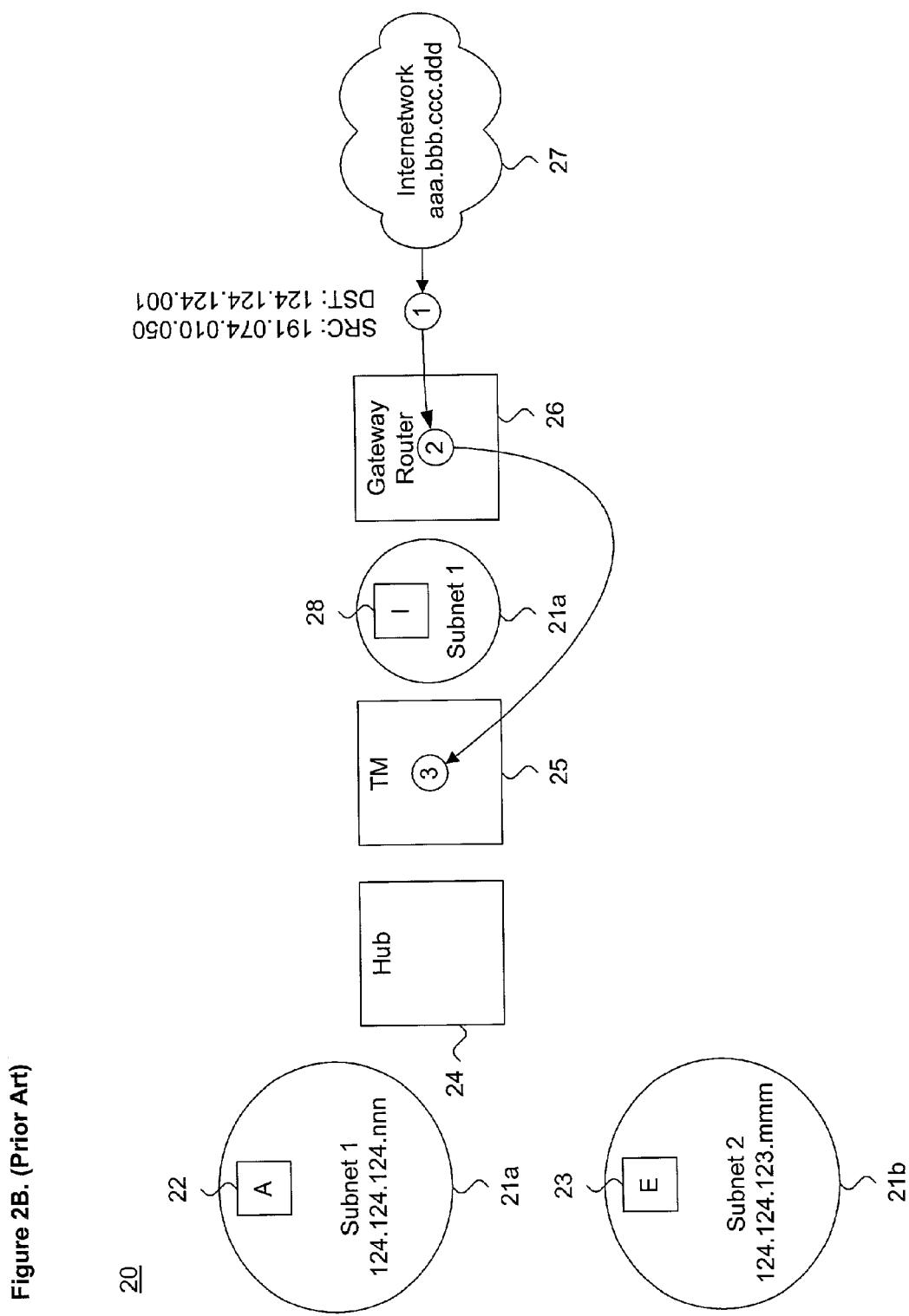
FIG. 2B is a topological network diagram showing the same prior art system for managing inbound packet traffic.

FIG. 2B is a topological network diagram showing the same prior art system 20 for managing inbound packet traffic. By way of example, an external host (not shown) operating in the internetwork 27 communicates with a receiving host 23 in the intranetwork 21b. An inbound packet originating from the external originating host is sent via the intranetwork 27 (step 1).

The gateway router 26 receives and forwards the packet to the intranetwork 21b (step 2). The packet passes through the traffic manager 25 and is counted (step 3). However, although the direction of travel of the packet is inbound, the traffic manager 25 cannot determine, based on the knowledge available, whether the originating host is either inside or outside of the network domain boundary and cannot detect a double-counting situation.

Figure 2C:
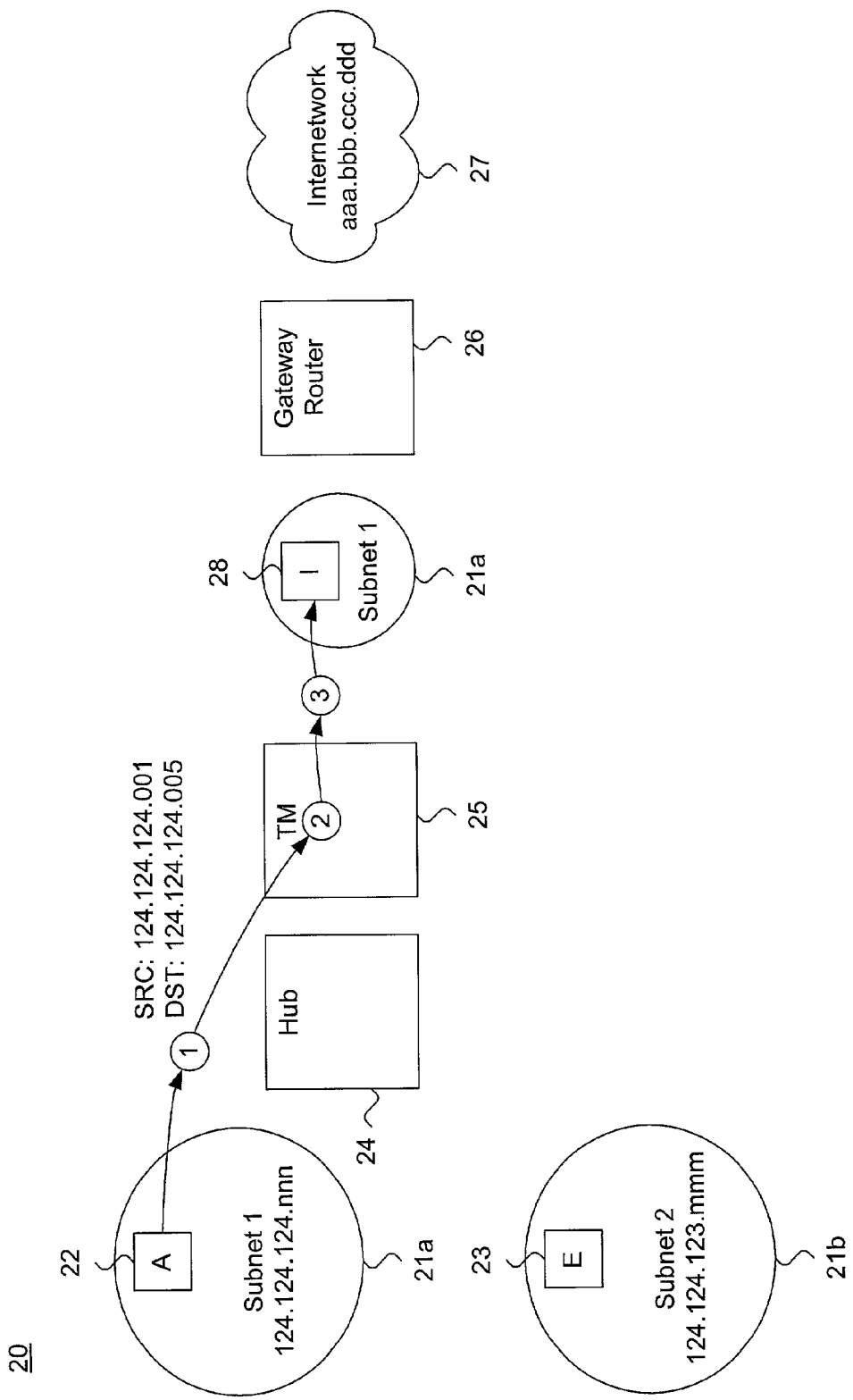
FIG. 2C is a topological network diagram showing the same prior art system for managing internal packet traffic.

FIG. 2C is a topological network diagram showing the same prior art system for managing internal packet traffic. By way of example, one internal host 22 communicates with another internal host 28 operating within the same intranetwork 21a.

The originating host 22 sends a packet having a source address (SRC) of 124.124.124.001 and a destination address (DST) of 124.124.123.005 (step 1). The packet passes through the traffic manager 25 and is counted for traffic management purposes (step 2). The packet is then received by the receiving host 28 (step 3). However, the traffic manager 25 cannot determine, based on the knowledge available, whether the receiving host is either inside or outside of the network domain boundary and cannot detect a double-counting situation. The logical subnetwork spans both "sides" of the traffic manager 25. Prior art routing tables and manual configurations therefore fail to distinguish the relative locations of participating hosts, as the traffic manager 25 cannot use the packet address to determine host locations.

Figure 3:
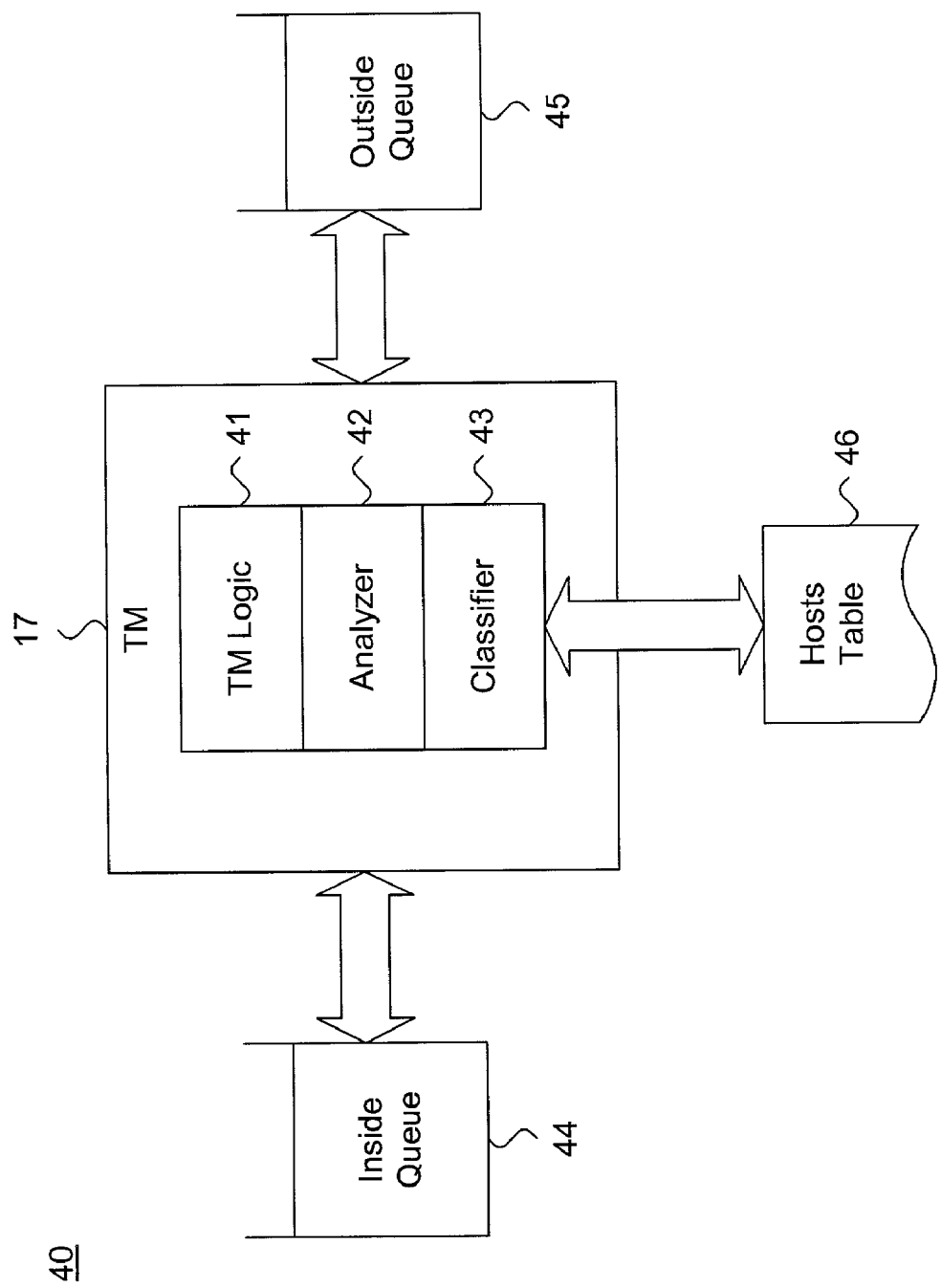
FIG. 3 is a functional block diagram showing the modules of the system of FIG. 1.

FIG. 3 is a functional block diagram showing the modules of the system 40 of FIG. 1. The system 40 is implemented within the traffic manager 17 (shown in FIG. 1) and works in conjunction with the basic traffic manager logic 41. The traffic manager 17 operates in a promiscuous mode, wherein all network traffic passes through. To address the problem of packet traffic being exchanged by systems spanning the network domain boundary yet located within the same subnetwork, the traffic manager 17 stores the physical media access controller (MAC) address of the gateway router 14. Packets outbound from the traffic manager 17 having a MAC address other than that of the gateway router 14 are identified as intranetwork packets and are handled in the same manner as any other intra-intranetwork or intranetwork-to-intranetwork packet, that is, no double-counting occurs.

An exemplary example of a traffic manager 17 suitable for use in the present invention is the Packet Shaper product operating in conjunction with Packet Wise software, version 5.0.0, sold and licensed by Packeteer, Inc., of Cupertino, Calif. The traffic manager 17 looks at end-to-end traffic at the transport layer. However, the implementation of the current approach to identifying internal hosts can also be implemented by analyzing point-to-point traffic in the network layer, as long as the source and destination addresses of the transient packets remain visible.

The system 40 consists of two basic modules. An analyzer module 42 analyzes packets transiting the traffic manager 17. The analyzer 42 inspects the source address and destination addresses of each transient packet as queued into an inside packet queue 44 and an outside packet queue 45. The inside packet queue 44 stages packets being received from and forwarded to the internal intranetwork domain. The outside packet queue 45 stages packets being received from and forwarded to the external internetwork domain. The analyzer module 42 determines whether a transient packet has been definitively classified and, if not, forwards the packet to a classifier module 43 for classification.

The classifier module 43 determines the relative location of the hosts referenced by the packet. The classifier module 43 classifies each packet and maintains a classification using a hosts table 46. As further described below beginning with reference to FIG. 4, hosts are classified into one of four states. An Unknown host is one that has not been classified by the traffic manager 17. An Outside host is a host that is located externally in the internetwork domain. An Inside host is a host that at least provisionally appears to be situated internally within the network domain boundary. Finally, an Inside with High Confidence host is a host that has been identified as definitively being located within the intranetwork domain.

Each module within the system 40 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The system 40 operates in accordance with a sequence of process steps, as further described below beginning with reference to FIG. 7.

Figure 4:
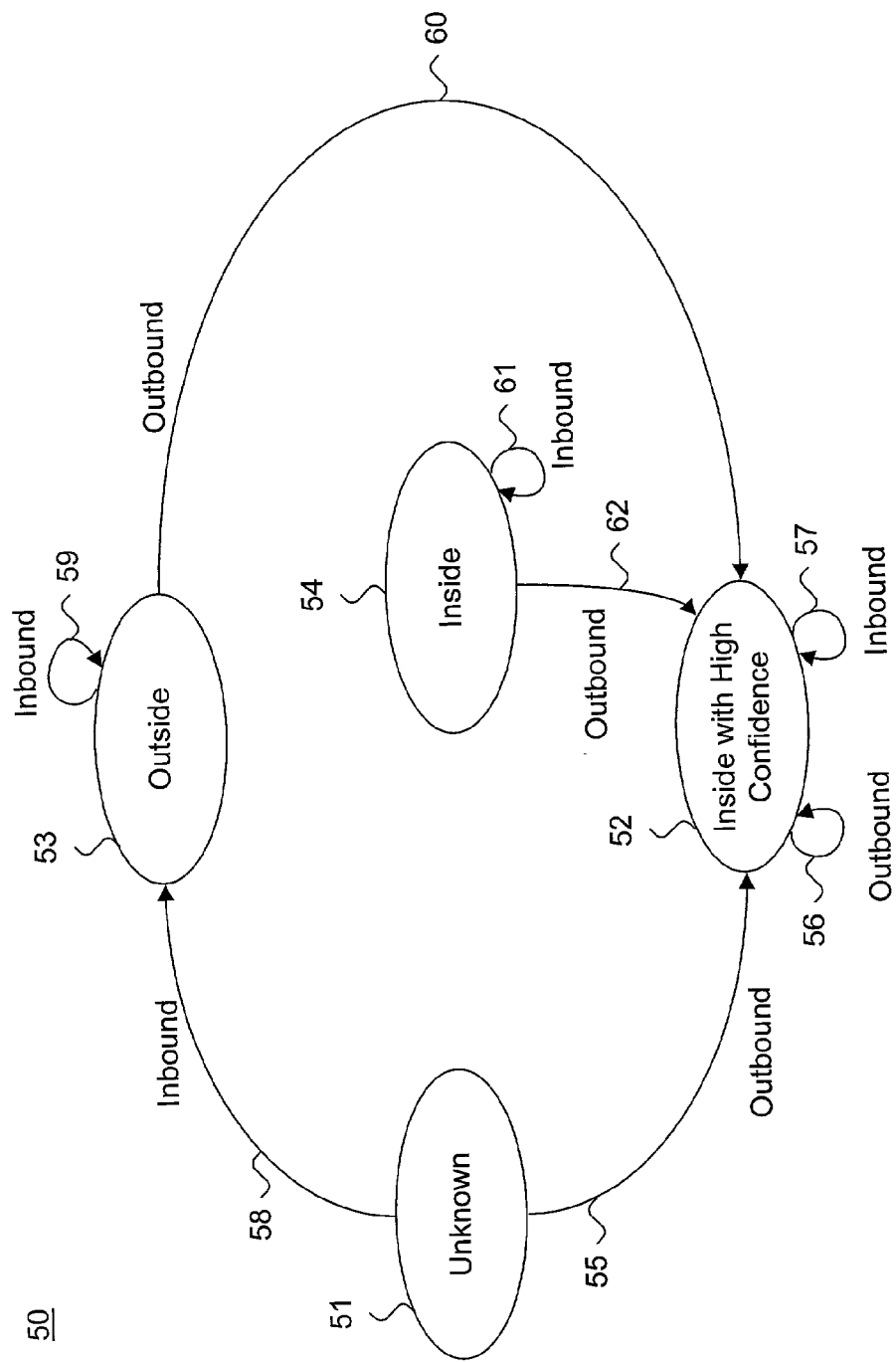
FIG. 4 is a state diagram showing a finite state machine for analyzing transient packet traffic based on source address.

FIG. 4 is a state diagram showing a finite state machine 50 for analyzing transient packet traffic based on source address. Transient packet traffic is analyzed based on the direction of flow and the source and destination addresses. Every host is initially classified as being in an Unknown state 51. If the packet is analyzed traveling in an outbound direction (transition 55), the originating host located at the source address of the packet is classified in an Inside with High Confidence state 52. This state indicates that the originating host is within the subnetwork and allows the traffic manager 17 (shown in FIG. 1) to properly account for any further transient packets originating from this host without double-counting.

If the packet is analyzed traveling in an inbound direction (transition 58), the originating host is classified in an Outside state 53. Any further packets also originating in an inbound direction (transition 59) from the same originating host are passed through and will not change the classification of the originating host as being in an Outside state 53. Otherwise, if a packet originating from the same originating host is analyzed traveling in an outbound direction (transition 60) from the Outside state 53, the originating host is reclassified as being an Inside with High Confidence state 52, under the assumption that the initially unknown originating host is actually located within the subnetwork.

As further described below with reference to FIG. 5, an originating host can be classified in an Inside state 54 only during the analysis of transient packet traffic based on destination address. Further transient packets traveling in an inbound direction (transition 61) from the Inside state 54 will not change the classification of the originating host as being in an Inside state 54, under the assumption that the packet was a route-back packet and therefore is located within the subnetwork. However, if a packet is analyzed traveling in an outbound direction (transition 62) from the Inside state 54, the originating host is reclassified in an Inside with High Confidence state 52.

All packet traffic flowing in an outbound direction (transition 56) or inbound direction (transition 57) from the Inside with High Confidence state 52 remains classified as such, as this state indicates that the originating host is definitively located within the subnetwork.

Figure 5:
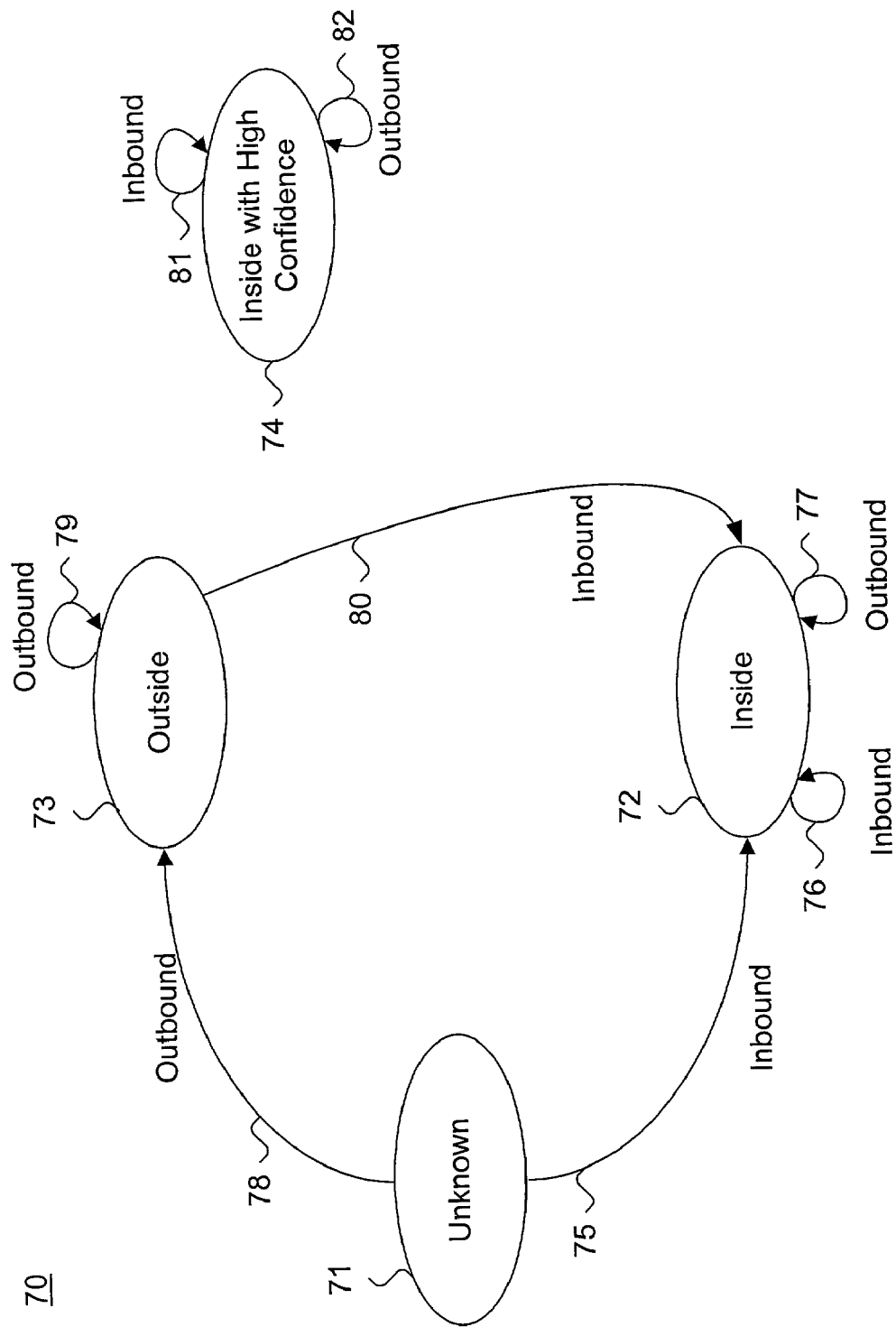
FIG. 5 is a state diagram showing a finite state machine for analyzing transient packet traffic based on destination address.

FIG. 5 is a state diagram showing a finite state machine 70 for analyzing transient packet traffic based on destination address. As before, transient packet traffic is analyzed based on the direction of flow and the source and destination addresses. Every host is initially classified as being in an Unknown state 71. If the packet is analyzed traveling in an inbound direction (transition 75), the receiving host is classified as being in an Inside state 72. The Inside state indicates that the receiving host is provisionally classified as being located within the subnetwork.

Otherwise, if a packet is analyzed traveling in an outbound direction (transition 78), the receiving host is classified as in an Outside state 73. Further transient packets traveling in an outbound direction (transition 79) from the Outside state 73 will not change the classification of the receiving host as being in an Outside state 73. Otherwise, if a packet is analyzed traveling in an inbound direction (transition 80) from the Outside state 73, the receiving host is reclassified in an Inside state 72, based on the assumption of the transient packet that originally caused the receiving host to be classified in an Outside state 73 was a route-back packet and therefore is located within the subnetwork.

All packet traffic flowing in an inbound direction (transition 76) or outbound direction (transition 77) from the Inside state 72 remains classified as such. Similarly, all packet traffic flowing in an outbound direction (transition 82) or inbound direction (transition 81) from the Inside with High Confidence state 74 remains classified as such, as this state indicates that the originating host is definitively located within the subnetwork.

Figure 6:
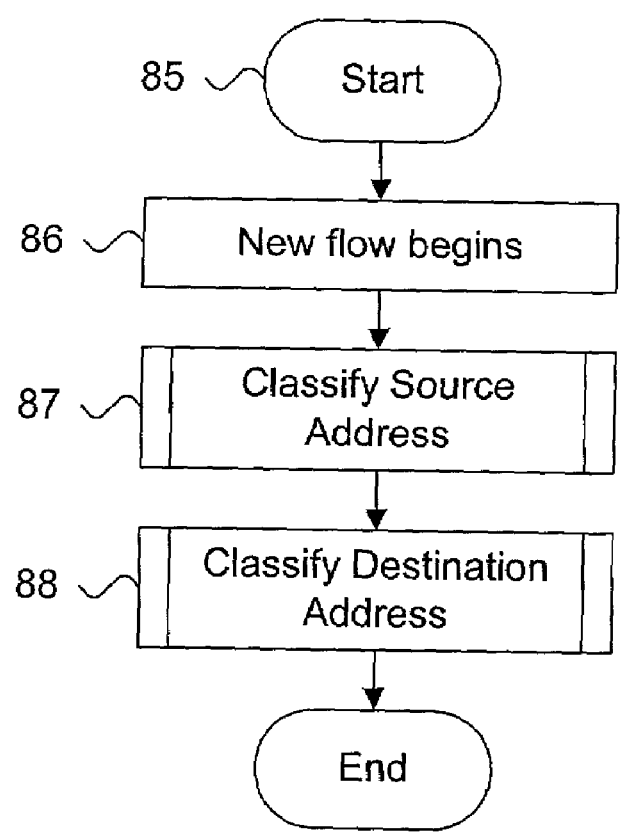
FIG. 6 is a flow diagram showing a method for dynamically identifying internal hosts in a heterogeneous computing environment with multiple subnetworks, in accordance with the present invention.

FIG. 6 is a flow diagram showing a method for dynamically identifying internal hosts 85 in a heterogeneous computing environment with multiple subnetworks, in accordance with the present invention. The purpose of this method is to classify hosts. The method is performed on each packet flow heading inbound and outbound.

Thus, classification begins with each new flow (block 86). The originating and receiving hosts are then classified, first, based on source address (block 87) and, then, on destination address (block 88), as further described below respectively in FIGS. 7 and 8. The method then terminates.

Figure 7:
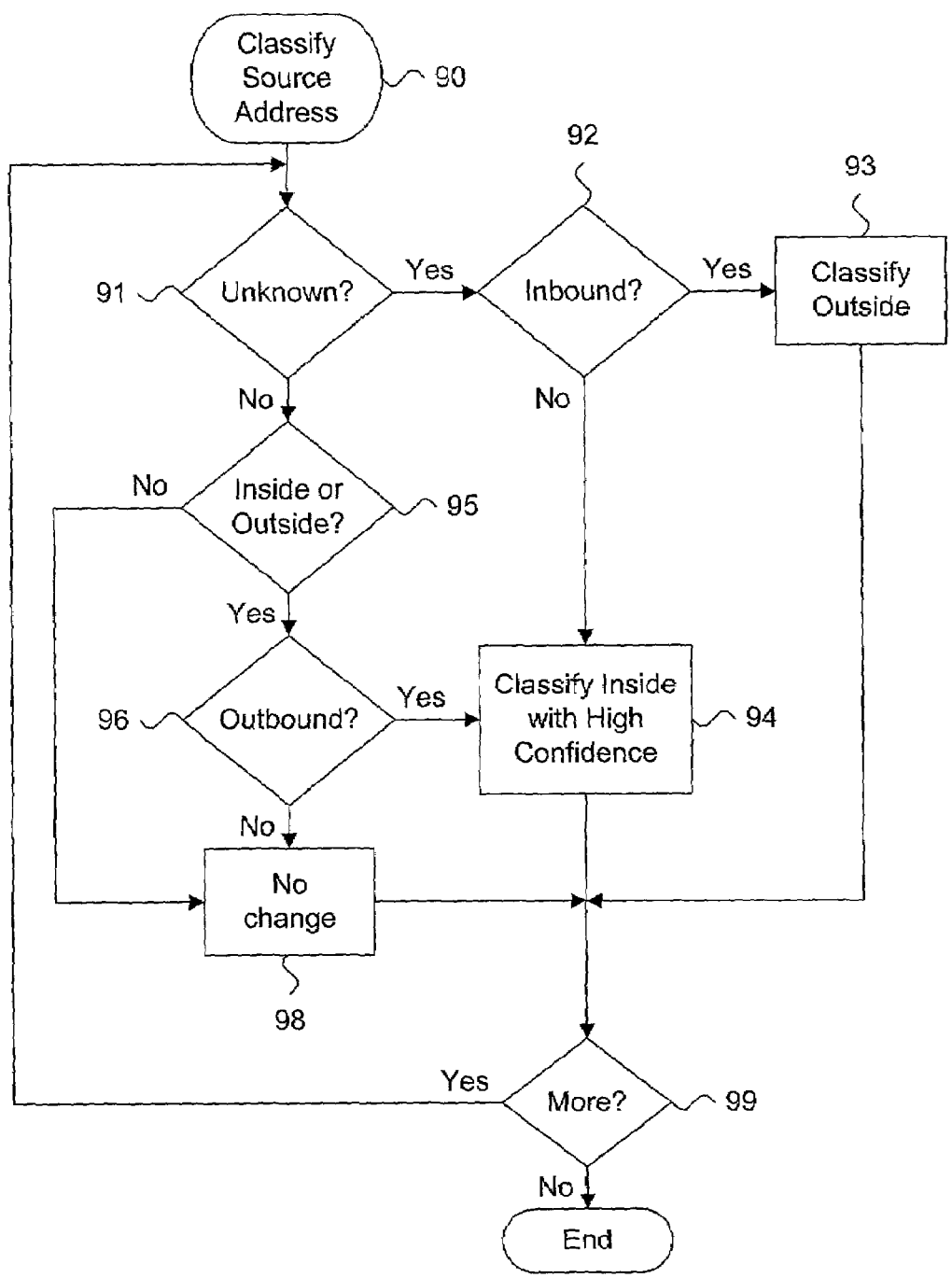
FIG. 7 is a flow diagram showing a routine for analyzing transient packet traffic based on source address for use in the method of FIG. 6.

FIG. 7 is a flow diagram showing a routine for analyzing transient packet traffic based on source address 90 for use in the method 85 of FIG. 6. This routine implements the finite state machine 50 of FIG. 4.

Thus, if the originating host of the packet is in an Unknown state 51 (shown in FIG. 4) (block 91), and is traveling in an inbound direction (block 92), the originating host is classified in an Outside state 53 (block 93). Otherwise, if the originating host is in an Unknown state 51 (block 91) but is traveling in an outbound direction (block 92), the originating host is classified in an Inside with High Confidence state 52 (block 94).

Otherwise, if the packet is currently classified in either an Inside state 54 or Outside state 53 and is traveling in an inbound direction (block 96), the originating host is classified in an Inside with High Confidence state 52 (block 94). Finally, if the packet is neither in an Inside state 54 or Outside state 53, that is, is either in an Inside with High Confidence state 52 (block 95) or is in the Inside state 54 or the Outside state 53, yet is traveling in an inbound direction (block 96), no change in classification occurs (block 98). Processing of packets continues as long as more packets arrive (block 99), after which the routine completes.

Figure 8:
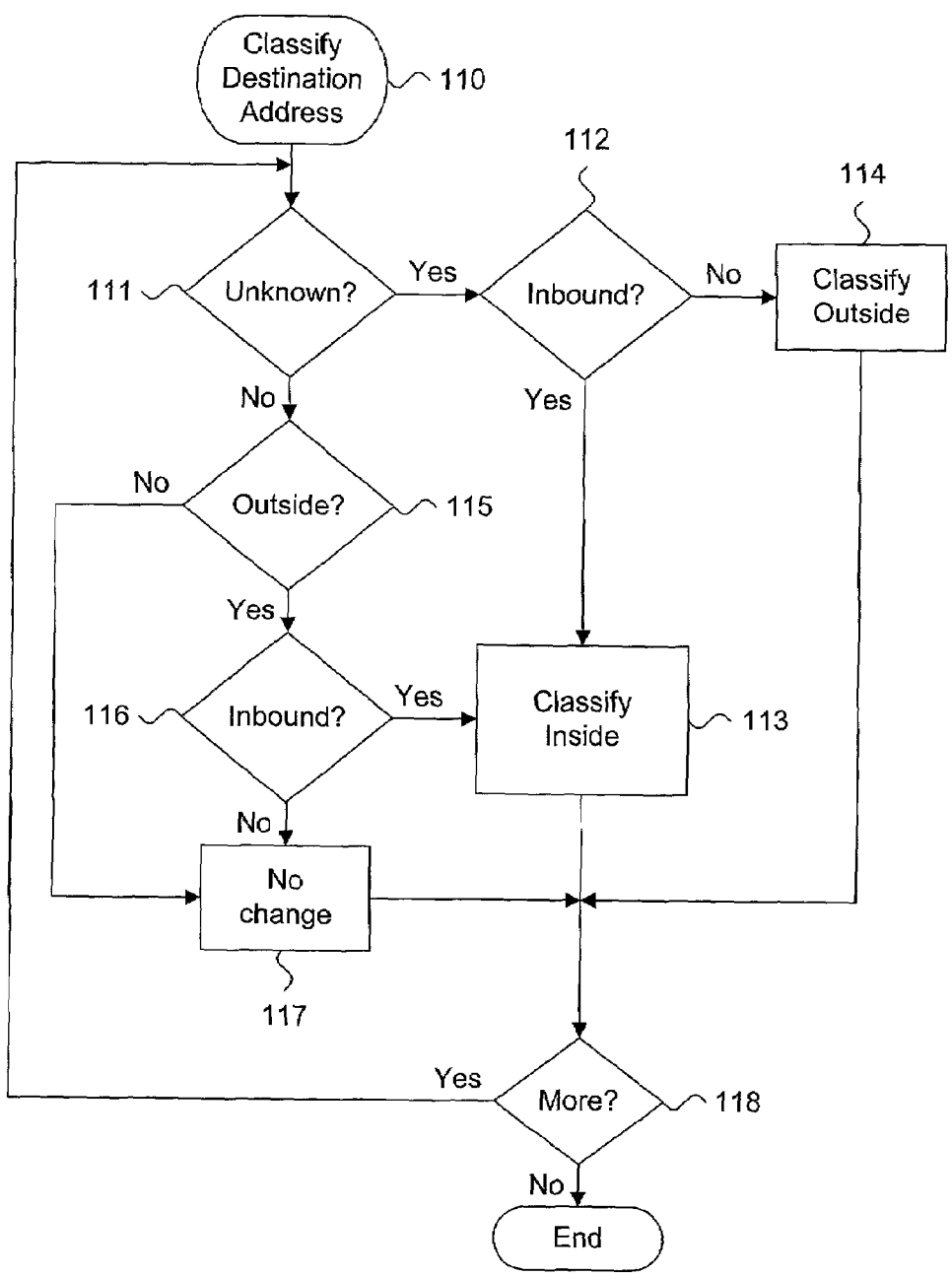
FIG. 8 is a flow diagram showing a routine for analyzing transient packet traffic based on destination address for use in the method of FIG. 6.

FIG. 8 is a flow diagram showing a routine for analyzing transient packet traffic based on destination address 110 for use in the method 85 of FIG. 6. This routine implements the finite state machine 70 of FIG. 5.

Thus, if the receiving host of the packet is in an Unknown state 71 (shown in FIG. 5) (block 111) and is traveling in an inbound direction (block 112), the receiving host is classified in an Inside state 72 (block 113). Otherwise, if the receiving host is in an Unknown Side state 71 (block 111) and is traveling in an outbound direction (block 112), the receiving host is classified in an Outside state 72 (block 114).

Otherwise, if the receiving host is classified in an Outside state 73 (block 115) and is traveling in an inbound direction (block 116), the receiving host is classified in an Inside state 72 (block 113). Finally, if the receiving host is not in an Outside state 73, that is, is either in the Inside state 72 or Inside with High Confidence state 74 (block 115) or is in an Outside state 73 but is traveling in an outbound direction (block 116), no change in classification occurs (block 117). Processing of packets continues as long as more packets arrive (block 118), after which the routine completes.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically identifying internal hosts in a heterogeneous computing environment with multiple subnetworks, comprising:

an analysis module analyzing a plurality of packets, each such packet comprising a source address of an originating host and a destination address of a receiving host; and a classification module classifying an unknown originating host located at the source address of an outbound packet as an inside host with high confidence, classifying an unknown receiving host located at the destination address of an inbound packet as an inside host, reclassifying the unknown receiving host as an inside host with high confidence upon receiving a further outbound packet having a source address corresponding to the address of the unknown receiving host, managing packet traffic flow by monitoring the packets and adjusting control flow thereof, and ignoring packet traffic flow for each packet with an originating host or a receiving host classified as an inside host with high confidence.

2. A system according to claim 1, farther comprising:

the classification module further classifying an unknown originating host located at the source address of an inbound packet as an outside host.

3. A system according to claim 2, further comprising:

the classification module reclassifying the unknown originating host as an inside host with high confidence upon receiving an outbound packet having a source address corresponding to the address of the unknown originating host.

4. A system according to claim 1, further comprising:
the classification module further classifying an unknown receiving host located at the destination address of an outbound packet as an outside host.

5. A system according to claim 4, further comprising:
the classification module reclassifying the unknown receiving host as an inside host with high confidence upon receiving an inbound packet having a destination address corresponding to the address of the unknown receiving host.

6. A system according to claim 1, further comprising:
the classification module maintaining the inside host with high confidence classification of the unknown originating host upon receiving at least one of further inbound packets and further outbound packets.

7. A system according to claim 1, further comprising:
the classification module maintaining the inside host with high confidence classification of the unknown receiving host upon receiving at least one of further inbound packets and further outbound packets.

8. A system according to claim 1, wherein the packets are communicated via a point-to-point protocol.

9. A system according to claim 1, wherein the packets are communicated via an end-to-end protocol.

10. A system according to claim 1, wherein the packets are communicated via the TCP/IP protocol and each source address and destination address is an internet protocol (IP) address.

11. A method for dynamically identifying internal hosts in a heterogeneous computing environment with multiple sub-networks, comprising:
analyzing a plurality of packets, each such packet comprising a source address of an originating host and a destination address of a receiving host;
classifying an unknown originating host located at the source address of an outbound packet as an inside host with high confidence;
classifying an unknown receiving host located at the destination address of an inbound packet as an inside host;
reclassifying the unknown receiving host as an inside host with high confidence upon receiving a further outbound packet having a source address corresponding to the address of the unknown receiving host;
managing packet traffic flow by monitoring the packets and adjusting control flow thereof; and
ignoring packet traffic flow for each packet with an originating host or a receiving host classified as an inside host with high confidence.

12. A method according to claim 11, further comprising:
classifying an unknown originating host located at the source address of an inbound packet as an outside host.

13. A method according to claim 12, further comprising:
reclassifying the unknown originating host as an inside host with high confidence upon receiving an outbound packet having a source address corresponding to the address of the unknown originating host.

14. A method according to claim 11, further comprising:
classifying an unknown receiving host located at the destination address of an outbound packet as an outside host.

15. A method according to claim 14, further comprising;
reclassifying the unknown receiving host as an inside host with high confidence upon receiving an inbound packet having a destination address corresponding to the address of the unknown receiving host.

16. A method according to claim 11, further comprising:
maintaining the inside host with high confidence classification of the unknown originating host upon receiving at least one of further inbound packets and further outbound packets.

17. A method according to claim 11, further comprising:
maintaining the inside host with high confidence classification of the unknown receiving host upon receiving at least one of further inbound packets and further outbound packets.

18. A method according to claim 11, wherein the packets are communicated via a point-to-point protocol.

19. A method according to claim 11, wherein the packets are communicated via an end-to-end protocol.

20. A method according to claim 11, wherein the packets are communicated via the TCP/IP protocol and each source address and destination address is an internet protocol (IP) address.

21. A computer-readable storage medium holding code for performing the method according to claim 11, 12, 13, 14, 15, 16 or 17.

22. A system for classifying hosts in a heterogeneous computing environment, comprising:
a table storing records comprising a plurality of states which each specify a location of a host relative to a network domain boundary, the states comprising:
an Unknown state describing an undefined host;
an Outside state describing a host located outside the network domain boundary;
an inside state describing a host provisionally located inside the network domain boundary; and
an Inside with High Confidence state describing a host located inside the network domain boundary;
a traffic manager classifying the hosts based on source address with each outbound packet originating from an Unknown state, Outside state or Inside state into an Inside with High Confidence state, classifying the hosts based on destination address with each inbound packet originating from an Unknown state or Outside state into an inside with High Confidence state, classifying the hosts based on source address with each inbound packet originating from an Unknown state into an Outside state, classifying the hosts based on destination address with each outbound packet originating from an Unknown state into an Outside state, and ignoring packet traffic based on source address or destination address with each outbound packet and each inbound packet originating from an Inside with High Confidence state.

23. A system according to claim 22, further comprising:
the traffic manager passing through packet traffic based on source address with each inbound packet originating from an Outside state, Inside state or Inside with High Confidence state and with each outbound packet originating from an Inside with High Confidence state.

24. A system according to claim 22, further comprising:
the traffic manager passing through packet traffic based on destination address with each outbound packet originating from an Outside state, inside state or Inside with High Confidence state and with each inbound packet originating from an Inside with High Confidence state.

25. A system according to claim 22, wherein the heterogeneous computing environment is IP compliant.

26. A method for classifying hosts in a heterogeneous computing environment, comprising:

defining a plurality of states which each specify a location of a host relative to a network domain boundary, the states comprising:
  an Unknown state describing an undefined host;
  an Outside state describing a host located outside the network domain boundary;
  an Inside state describing a host provisionally located inside the network domain boundary; and
  an Inside with High Confidence state describing a host located inside the network domain boundary;
classifying the hosts based on source address with each outbound packet originating from an Unknown state, Outside state or Inside state into an Inside with High Confidence state;
classifying the hosts based on destination address with each inbound packet originating from an Unknown state or Outside state into an Inside with High Confidence state;
classifying the hosts based on source address with each inbound packet originating from an Unknown state into an Outside state;
classifying the hosts based on destination address with each outbound packet originating from an Unknown state into an Outside state; and
ignoring packet traffic based on source address or destination address with each outbound packet and each inbound packet originating from an Inside with High Confidence state.

27. A method according to claim 26, further comprising:
passing through packet traffic based on source address with each inbound packet originating from an Outside state, Inside state or inside with High Confidence state and with each outbound packet originating from an Inside with High Confidence state.

28. A method according to claim 26, further comprising;
passing through packet traffic based on destination address with each outbound packet originating from an Outside state, Inside state or Inside with High Confidence state and with each inbound packet originating from an Inside with High Confidence state.

29. A method according to claim 26, wherein the heterogeneous computing environment is IP compliant.

30. A computer-readable storage medium holding code for performing the method according to claim 26, 27 or 28.

* * * * *